United States Patent [19]

Norman, III

[11] Patent Number: 4,533,952
[45] Date of Patent: Aug. 6, 1985

[54] DIGITAL VIDEO SPECIAL EFFECTS SYSTEM

[75] Inventor: James W. Norman, III, Gainesville, Fla.

[73] Assignee: Digital Services Corporation, Gainsville, Fla.

[21] Appl. No.: 436,066

[22] Filed: Oct. 22, 1982

[51] Int. Cl.³ .................. H04N 5/14; H04N 9/535
[52] U.S. Cl. ................................. 358/160; 358/22
[58] Field of Search .................. 358/22, 183, 160; 382/41, 44–47

[56] References Cited

U.S. PATENT DOCUMENTS

| | | | |
|---|---|---|---|
| 3,821,468 | 6/1974 | Busch | 358/183 |
| 3,941,925 | 3/1976 | Busch et al. | 358/183 |
| 4,035,832 | 7/1977 | Stalley et al. | 358/17 |
| 4,080,626 | 3/1978 | Hurst et al. | 358/22 |
| 4,081,833 | 3/1978 | Akiyama | 358/153 |
| 4,101,939 | 7/1978 | Owen et al. | 358/153 |
| 4,121,253 | 10/1978 | McCoy | 358/183 |
| 4,134,128 | 1/1979 | Hurst | 358/22 |
| 4,148,070 | 4/1979 | Taylor | 358/160 |
| 4,152,719 | 5/1979 | Kellar | 358/22 |
| 4,156,237 | 5/1979 | Okada et al. | 358/22 |
| 4,163,249 | 7/1979 | Michael et al. | 358/22 |
| 4,163,992 | 8/1979 | Inaba et al. | 358/22 |
| 4,170,026 | 10/1979 | Nagaoka et al. | 358/10 |
| 4,172,264 | 10/1979 | Taylor et al. | 358/22 |
| 4,178,613 | 12/1979 | Takahashi et al. | 358/22 |
| 4,183,046 | 1/1980 | Dalke et al. | 358/22 |
| 4,199,788 | 4/1980 | Tsujimura | 358/183 |
| 4,199,790 | 4/1980 | Greenfield et al. | 358/22 |
| 4,200,890 | 4/1980 | Inaba et al. | 358/183 |
| 4,204,227 | 5/1980 | Gurley | 358/183 |
| 4,218,710 | 8/1980 | Kashigi et al. | 358/22 |
| 4,220,965 | 9/1980 | Heitmann et al. | 358/22 |
| 4,249,211 | 2/1981 | Baba et al. | 358/183 |
| 4,258,389 | 3/1981 | Sakamoto | 358/154 |
| 4,266,242 | 5/1981 | McCoy | 358/22 |
| 4,267,560 | 5/1981 | Ishikawa et al. | 358/22 |
| 4,282,546 | 8/1981 | Reitmeier | 358/22 |
| 4,302,776 | 11/1981 | Taylor et al. | 358/160 |
| 4,415,928 | 11/1983 | Strolle et al. | 358/160 |
| 4,432,009 | 2/1984 | Reitmeier et al. | 358/22 |

Primary Examiner—Tommy P. Chin
Assistant Examiner—Michael D. Parker

[57] ABSTRACT

A video special effects processing system for superimposing a key video picture on a reference video picture. A key video signal which corresponds to the key video picture is stored in digital form in a memory in locations which are addressable by data corresponding to coordinate pairs. In a preferred embodiment, the video data stored in the memory is read out in accordance with a manipulated coordinate pair, thereby achieving a predetermined type of displacement effect on a video screen. The manipulated coordinate pairs are produced in response to the original coordinate pairs which identify the memory addresses and function data provided by a central processing unit (CPU), which processes the data in accordance with a mathematical function which defines the special effect which is desired to be achieved. The original coordinate pair data and the function data are arithmetically manipulated in a hardware-implemented manipulator in accordance with a generalized video effects equation.

17 Claims, 7 Drawing Figures

FIG. 3

DIGITAL VIDEO SPECIAL EFFECTS SYSTEM

BACKGROUND OF THE INVENTION

This invention relates generally to systems for manipulating video signals, and more particularly, to a digital system which manipulates digitized video information after it has been stored in a memory.

Conventional video special effects systems utilize analog circuitry for directly manipulating an analog video signal. In such systems, an input video signal is subjected to the effects of modifying analog signals such as ramp, sawtooth, and other signals, to produce a variety of special effects. Such effects may be chroma-keyed to produce picture effects resembling hearts, stars, circles, and other predetermined designs. The known analog systems, however, are difficult to maintain and operate, require complex and expensive analog circuitry which must be finely tuned before each use, and must generally be operated so as to be in synchrony with the video input signal. Moreover, such analog systems are generally quite limited in the number and nature of available special effects, and are not easily reprogrammed.

Digital systems are known which are specifically adapted to the generation of video special effects and which alleviate some of the problems of analog systems. Such known digital special effects systems, however, also operate directly upon the video data which is stored in memory in the form of pixels. As such, therefore, such digital video special effects systems generally require large amounts of data storage space and oftentimes must operate in synchrony with the video input signal. Accordingly, such systems are complex and expensive, thereby rendering them available only to large television studios. More importantly, this type of a video special effects system cannot produce rotative and other displacement effects.

A further known digital special effects arrangement utilizes computational circuitry which operates upon the data pertaining to the address locations of a memory which contains stored video information. This known address manipulating system is limited in its capabilities to compressing or expanding the video information, as it is presented on the video screen, and establishing video priority whereby selected portions of the video screen show only the video image having priority for that particular portion.

A further digital special effect system which utilizes the concept of restructuring memory addresses upon readout is adapted to produce mirror image effects and reversal effects. Moreover, this further known system enables conversion between video standards, illustratively between the NTSC North American System and the PAL European System.

It is a problem with the known systems which utilize address restructuring that a simple and economical technique for producing rotative and three dimensional effects has not been provided heretofore because complex equations which define the rotative effects must be solved quickly for each new pixel as it is placed on the video screen.

It is, therefore, an object of this invention to provide a digital special effects arrangement for video which can perform expansive, compressive, rotative, and other video image displacing effects. It is a further object of this invention to provide a special effects arrangement which performs video special effects by restructuring memory addresses during read out of the data stored in the memory in response to a predeterminable equation which defines the special effect.

It is a still further object of this invention to provide a special effect arrangement wherein the memory address of each pixel is restructured in accordance with a predeterminable equation which defines the desired special effect immediately prior to the placement of the pixel on the video screen.

It is yet another object of this invention to provide a video special effects processing system wherein memory address data is manipulated in accordance with predeterminable mathematical functions; the manipulations being performed in a hardware-implemented processor for solving a generalized equation.

SUMMARY OF THE INVENTION

The foregoing and other problems are alleviated by this invention which provides a digitally operated system for producing video special effects with respect to a video input signal. The system is provided with a coordinate generator for producing address signals which are synchronized with the video input signal. The address signals are generated in a predetermined sequence and a predetermined number of such signals are produced during each of the scan signal portions of the video input signal. A key video signal is digitized by an analog-to-digital converter which produces digital samples of the key video signal in synchrony with the address signals of the coordinate generator means. The address signals correspond to respective memory locations in a memory which stores the pixel information pertaining to the key video signal in the respective memory locations defined by the address signals produced by the coordinate generator. In this manner, a key map is produced in the memory which corresponds, directly on a one-to-one basis, to the video picture which is defined by the key video signal. Each memory location contains, therefore, the information necessary to define an on-off "pixel" which corresponds to a dot having predetermined luminance in the video screen image. In accordance with the invention, a microprocessor is used with a hardware-implemented manipulator to call out selected ones of the pixels to new coordinates of the output scan; the new coordinate reassignments being selected in accordance with solutions to a predetermined, generalized equation.

In a preferred embodiment of the invention, the pixel information of the key video signal remains in its original memory location in the memory, and only the output address is recalculated. In this manner, the original key map is preserved and only the output sequence is changed under control of the microprocessor. This arrangement provides the further advantage that a high speed randomaccess memory (RAM) of the type which need not be refreshed may be utilized, thereby improving data access speed.

It is a feature of this invention that the video special effects are driven by software, thereby permitting a variety of such effects to be programmed. The programs for the special effects may be contained in programmable readonly memories (PROMs) which are easily removed to permit selection of a desired one or sequence of special effects. Alternatively, a plurality of such PROMs, may be contained on expansion boards of the system.

In a particularly advantageous embodiment of the invention, processing speed is improved by implementing a portion of the process of the new coordinate reassignment manipulations in hardware. Such "pipelining" of the arithmetic processing system substantially reduces the effective time required to perform the reiterative calculations of a generalized mathematical equation over conventional software driven arrangements. In this advantageous embodiment, a hardware-implemented arithmetic manipulator for the coordinates of the pixels is arranged to cooperate with a central processing unit (CPU) which generates mathematical functions which may contain trigonometric parameters. More specifically, the various mathematical and arithmetic routines which are required to be performed to achieve a desired video special effect are divided between the CPU and the manipulator.

The overall system operates on the premise that the special effects can be performed upon the solving of a generalizable equation. As previously indicated, a video image is stored in a memory, and the information stored in the various memory locations can be read out in accordance with a manipulated memory address, or coordinate, sequence. Although the original pixel information is preserved in the memory, such information is presented on the video screen at respective coordinate positions which do not necessarily correspond with the coordinate positions of the image stored in the memory. The new coordinate positions, which represent the location of the pixel information on the video screen, correspond to a solution of an effect-defining equation.

In accordance with the invention, the CPU provides x and y function data to the registers of the manipulator. The function data corresponds to portions of a generalized mathematical equation which defines the extent to which the coordinate position of a pixel on the video screen differs from the coordinate address of the image stored in the memory. The generalized equation appears as follows:

$$M(address) = X(coor.)f_x + Y(coor.)f_y + \text{offset This}$$

This equation indicates that the address (M(address)) where the desired pixel which is to be placed on the screen is found in the memory corresponds to an x coordinate value (X(coor.)) operated upon by a function of x,($f_x$), and a y coordinate (Y(coor.)) operated upon a function of y,($f_y$). The equation further provides an offset value which defines the position of the effect on the video screen.

The X(coor.) and Y(coor.) information is received by the manipulator from an x, y coordinate generator. The manipulator is provided with multiplier hardware for multiplying the coordinate information received from the x, y coordinate generator with the $f_x$ and $f_y$ function information received from the CPU. The multipliers therefore produce at their respective outputs the X(coor.)$f_x$ and the Y(coor.)$f_y$ portions of the generalized equation. In a particularly advantageous embodiment of the invention, the multiplication process must be achieved at a speed which exceeds the capability of some commercially available multiplication circuits. Accordingly, a multiplexing arrangement is provided for permitting the multipliers to produce the product solutions at the rapid rate of illustratively 70 ns., while each multiplier operates at a slower rate. Persons skilled in the art would know how to produce a practicable embodiment of the invention without the multiplexing arrangement if sufficiently fast multiplication circuitry is available.

The products of the function and coordinate data, which are available at the outputs of the multipliers, are conducted to respective adders for performing the addition of the products. In accordance with the invention, the value representing the sum of the products is stored in a plurality of registers, each such register having a predetermined radix point selection. For example, one such register may store the sum of the products in a form which corresponds to one sign bit, eight bits on the left of the radix point, and three bits on the right of the radix point. A second register may store the sum of the products in a form which corresponds to one sign bit, five bits to the left of the radix point, and six bits to the right of the radix point. A third such register may store the sum of the products in a form corresponding to one sign bit, two bits to the left of the radix point, and nine bits to the right of the radix point; and a fourth register may store the information as one sign bit, no bits to the left of the radix point, and eleven bits to the right of the radix point. Of course, persons skilled in the art can devise different formats for the sum of the products, and different numbers of available formats. In this illustrative embodiment, since only four formats are available, the desired format is selected by two-bit radix point choice data from the CPU. Subsequently, the sum of the products, in its selected radix format, is added to offset information which determines the position of the special effect on the video screen. The manipulator is further provided with comparator circuitry for providing off map indications which determine whether the special effect is occurring within the predesignated constraints of the image in memory.

BRIEF DESCRIPTION OF THE DRAWINGS

Comprehension of the invention is facilitated by reading the following detailed description in conjunction with the annexed drawings, in which:

FIG. 3 is a block and line representation of an x,y coordinate generator constructed in accordance with the invention; and FIG. 4 is a diagram illustrating the relationship between FIGS. 5, 6 and 7 which, taken together, form a block and line representation of an x,y coordinate manipulator constructed in accordance with the invention.

DETAILED DESCRIPTION

Figure 1:
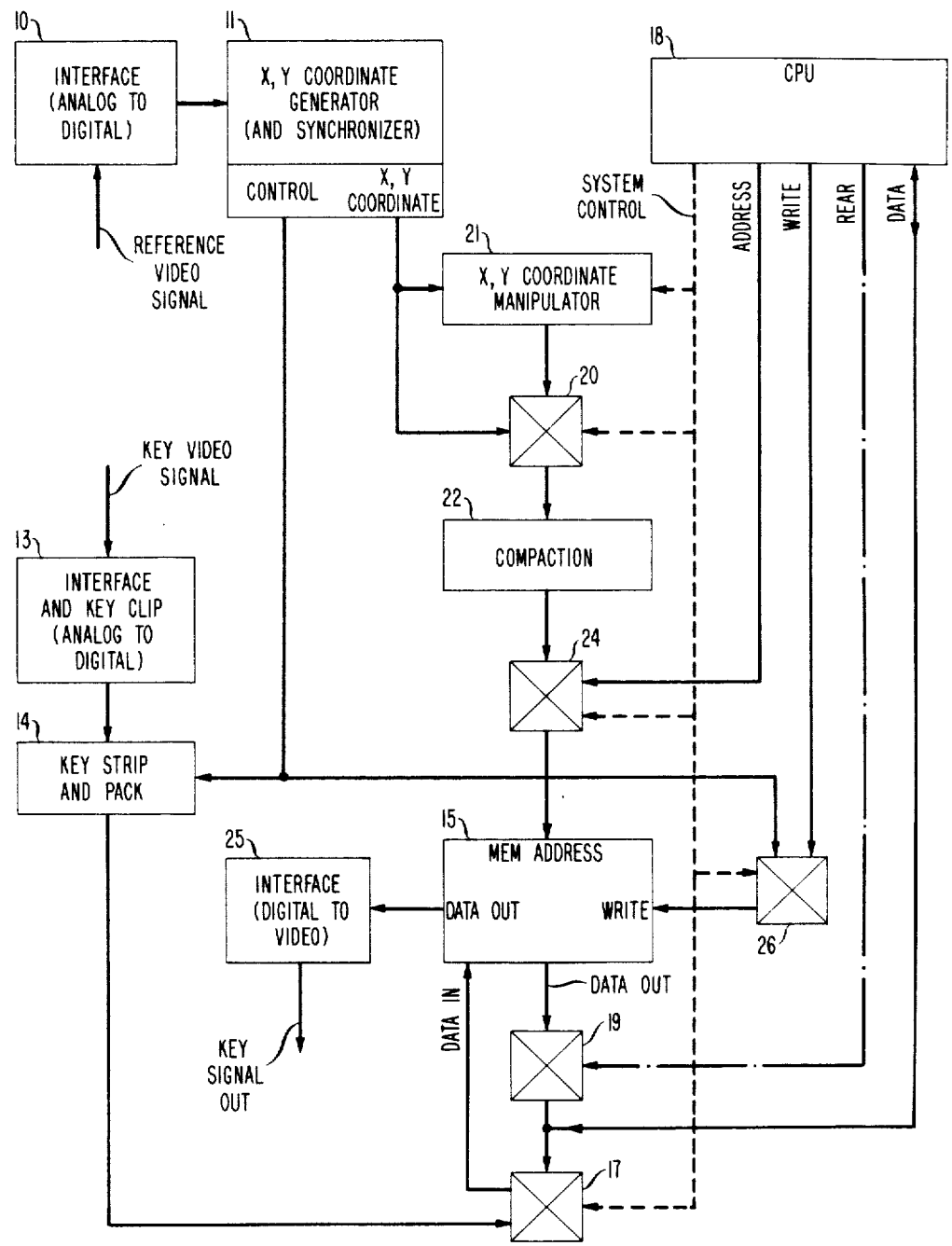
FIG. 1 is a block and line representation of a onebit digital video manipulation circuit which manipulates memory addresses to produce a monochrome key video signal in accordance with the invention.

FIG. 1 is a block and line representation of a onebit, digital video special effects arrangement which manipulates memory addresses for a memory to produce a monochrome key video signal. As shown, the circuitry of FIG. 1 receives a reference video signal and a key video signal. In essence, the reference video signal corresponds to background video information. The video picture associated with the reference video signal may be any video image which is desired to be provided with a second, or key, video image therein. The key video image may consist of alphanumeric characters or a key video picture, which is represented by the key video signal.

The reference video signal is received at an interface circuit 10 which contains an analog-to-digital converter. A sync signal which is present in the reference video signal is removed by sync separation circuitry, which may be of a known type, incorporated in interface circuit 10. The sync signal which is removed from the reference video signal is converted, in one embodiment of the invention, into TTL digital form and provided at an output of interface circuit 10.

The digitized sync signal at the output of interface circuit 10 is conducted to an input of an x, y coordinate generator and synchronizer which receives the digitized sync signal and determines the vertical (V) blanking. The y portion of the x, y coordinate pair is determined in coordinate generator and synchronizer 11 by starting a field of video from the V blanking and counting lines and sync pulses. In addition, the coordinate generator and synchronizer is provided with a 70 nanosecond clock which is synchronized with the sync pulses. The 70 nanosecond clock is the pixel counter which counts the pixels across each horizontal line of the video raster, to produce the x coordinate. As described, therefore, x, y coordinate generator and synchronizer 11 counts sync pulses to produce a y coordinate, and counts the 70 nanosecond clock pulses to produce an x coordinate. In this manner, the coordinate generator and synchronizer produces a unique coordinate address for each pixel on every line of the video raster. As indicated in FIG. 1, coordinate generator and synchronizer 11 provides the x, y coordinate information at a first output, and a control signal at a second output. The signal present at the control output provides synchronization for other elements of the system, as will be described hereinbelow. Also, a more detailed description of the circuitry and functions performed within the x, y coordinate generator and synchronizer 11 will be provided with respect to the discussion of FIG. 3.

The key video signal is received at an interface and key clip 13 which also contains an analog-to-digital converter. It must first be understood that a "key" in the television and video industry is known as an area of a video signal which is replaced with a different video signal. In essence, a "keyhole" is cut from a portion of the picture formed from the reference video signal, and a different video signal is inserted therein. The key video signal contains the video information from which the shape of the "keyhole" is derived. Interface and key clip 13 receives the key video signal, discriminates its voltage levels, clips the key video signal at a predetermined reference level, creates on/off signals representing the image area, and turns the resulting signal into a digital key video signal.

The digital key video signal is conducted from an output of interface and key clip 13 to an input of a key strip and pack 14. Key strip and pack 14 receives a continuous, digitized form of the key video signal which is produced in interface and key clip 13 by a sampling operation every 70 nanoseconds. Thus, the continuous digital signal goes on or off every 70 nanoseconds; the respective samples being packed into a register. When eight of the samples have been packed into a register, the control signal from x, y coordinate generator 11 causes the eight stored samples to be entered into a memory 15, as a byte. In a practicable embodiment of the invention, the packing of eight samples into a byte is achieved by means of an internal shift register (not shown) which is known in the art.

The byte formed of eight separate pixels which is produced by key strip and pack 14 is conducted to a switch 17. Switch 17 operates under the control of a central processing unit (CPU) 18. Such control is indicated by the dashed line which connects switch 17 to a system control output of CPU 18. Under control of the CPU, switch 17 selects whether the digitized key video signal byte, or data from the CPU, is conducted to a DATA IN input of memory 15.

The x, y coordinate output of coordinate generator and synchronizer 11 is connected to an input of a switch 20 which, as is the case with switch 17, is under the control of the CPU. The x, y coordinate signals from coordinate generator and synchronizer 11 are also conducted to a coordinate manipulator 21 which will be described in detail hereinbelow with respect to FIGS. 4–7. Coordinate manipulator 21 produces at its output manipulated coordinates which are conducted to a further input of switch 20. Switch 20 produces at its output selectably either the x, y coordinates from coordinate generator and synchronizer 11, or the manipulated coordinates from coordinate manipulator 21; the selection being determined by signals at the system control output of CPU 18. The addressing x, y coordinates, whether they be derived directly from coordinate generator and synchronizer 11, or from coordinate manipulator 21, are used to address memory 15. Memory 15, which in one embodiment may be a 64K×33 8 RAM array, receives the x, y coordinates at a memory address input via circuitry which will be described below. When the arrangement is operating in a mode for writing digitized key video signal information into memory 15, the memory must be addressed in real time without manipulation. Thus, such addressing is achieved using the x, y coordinates from the coordinate generator and synchronizer. However, when the stored key video signal is desired to be read out of the memory, the addressing is performed by the x, y coordinates which have been manipulated by coordinate manipulator 21. CPU 18, therefore, by operation of switch 20, selects whether direct or manipulated forms of the x,y coordinates will address memory 15. The 8-bit bytes of pixels are available to CPU 18 at its DATA input via a switch 19 which is itself controlled by the CPU. Such communication between the memory and the CPU is not essential to the present invention.

In this specific illustrative embodiment of the invention, the coordinates which are used to address memory 15 are compacted in a compaction circuit 22 which reduces the total addressing data. In this embodiment, the purpose of the compaction circuit is to compact the data of the x, y coordinates, where the x coordinate and the y coordinate each have 10 bits, down to 19 bits. This is achieved by realizing that although all 10 bits of x and all 10 bits y are required to completely define all of the pixels x and lines y on a PAL European television system, such a system does not use all of the different possible 10 bit codes for x, and all of the possible 10 bit codes y. In essence, the compaction scheme takes the total number of legal x, y coordinates in a 10 bit x and 10 bit y scheme, and compacts it down to 19 total bits. In this specific illustrative embodiment where memory 15 is a 64K×8 RAM, it is evident that 16 bits are required to address 64K of storage locations and 3 bits are required to address 8 pixels within each storage location. Thus, 19 bits issuing from the output of compaction circuit 22 will suffice to address the entire contents of memory 15. More specifically, the first 16 bits address all of the 64K of the bytes, and the other 3 bits address the 8 pixels within each byte.

The output of compaction circuit 22 is connected to an input of a switch 24 which, under control of CPU 18, selects whether memory 15 receives 19 addressing bits from compaction circuit 22, or the address output of CPU 18. In a serial-in mode of operation, a key video signal is clipped and packed into bits, and is sent to the data input of memory 15. An x, y coordinate is conducted directly from coordinate generator and synchronizer 11 via compaction circuit 22 to the memory address of memory 15. With data and address available, a write pulse received at the write input of memory 15 causes the data to be written into the memory at the proper x, y coordinates.

The key video signal image which is stored in memory 15 is in the form of an x, y coordinate representation of a full size image. In order to facilitate the reading out of the image data in the memory to create a manipulated image, coordinate manipulator 21, in this embodiment, has been preloaded with arithmetic parameters from CPU 18. The coordinate manipulator will be described in detail with respect to FIG. 3 hereinbelow. By operation of the arithmetic parameters, coordinate manipulator 21 solves a predetermined equation on the currently available x, y coordinate which is provided to it, and sends the new manipulated coordinate to the compaction circuit. The compaction circuit once again compacts the 20 bit data down to 19 bits and conducts the data as a 19 bit address signal to memory 15, representing an x, y coordinate. At this time, the memory does not receive a write pulse, and therefore memory 15 remains in a read mode. Thus, memory 15 produces a 1 bit pixel which has been uniquely addressed. The 1 bit pixel is either "on" or "off" indicating whether or not to insert the key image. This 1 bit pixel is conducted to an interface 25 which contains a digital-to-video converter. Thus, interface 25 produces an analog key video signal at its output which can be conducted to any standard TV broadcast switcher and which can be used in the switcher to indicate where the desired key image is to be inserted.

It should be noted in FIG. 1 that the dashed-dotted lines indicate CPU control lines, and that the CPU, by means of switch 24, can provide an address signal to memory 15. The CPU can also provide a write signal through a switch 26 to memory 15. Thus, since the CPU can generate data to be written into memory 15, the memory can be thoroughly accessed. This enables the performance of "block wipes" wherein the pixels around the 0,0 coordinate location are blown up on the video screen with the aid of the coordinate manipulator until these pixels are the desired size. In essence, little blocks are made on the screen. In a further specific embodiment, the writing of a one or a zero at a pertinent pixel will turn the entire block on or off for the key picture. The CPU can then set and unset the blown up pixels around the 0,0 coordinate, thereby permitting block wipes to be performed in accordance with a variety of desired patterns.

Figure 2:
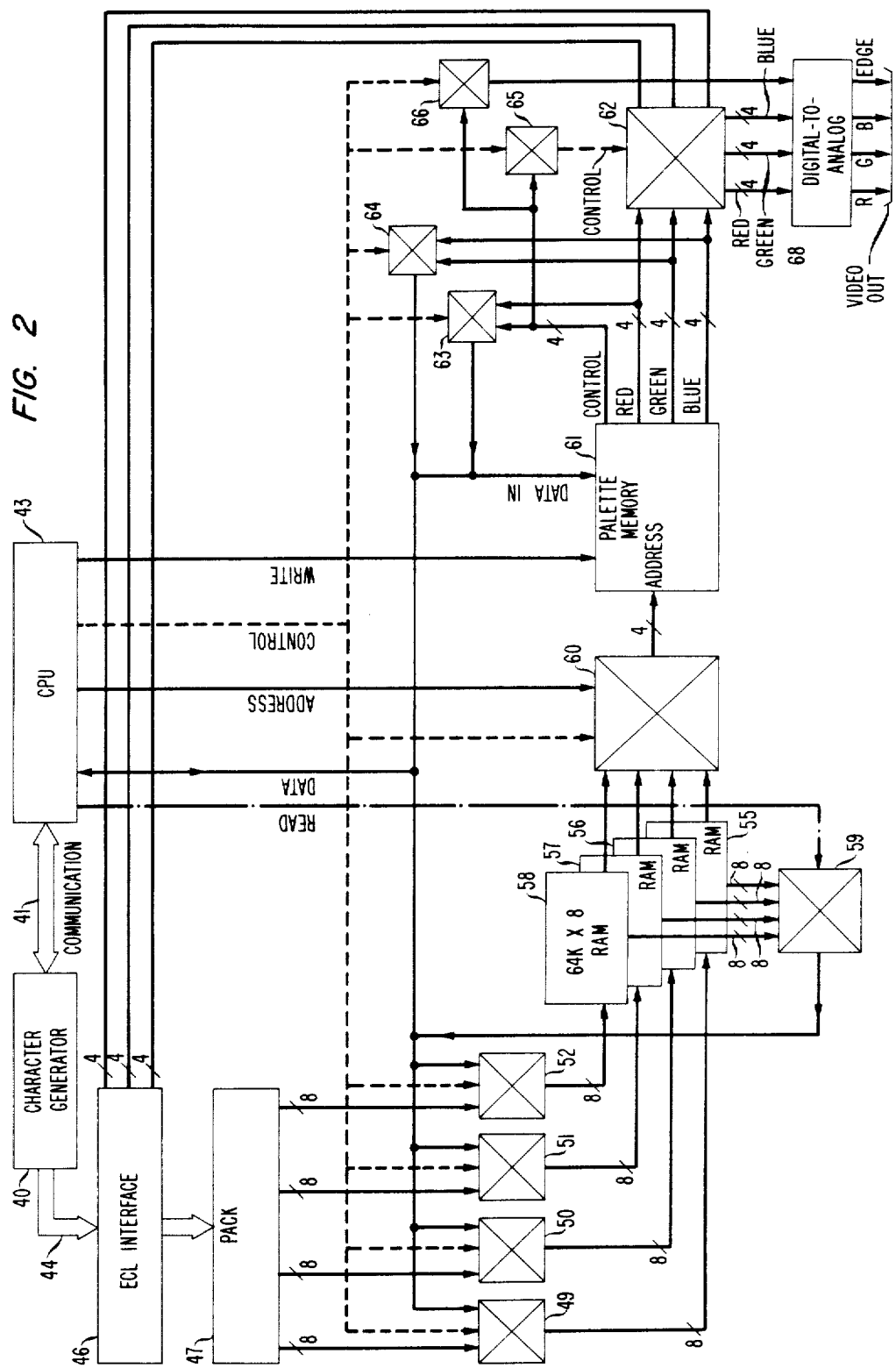
FIG. 2 is a block and line representation of a four-bit, sixteen color embodiment of the invention.

FIG. 2 is a block and line representation of a four bit, sixteen color embodiment of the invention. In this embodiment of the invention, the video special effects arrangement manipulates data and memory addresses pertaining to multicolor information, and video character information which is produced by a character generator 40. The character generator may be of a known, commercially available type, such as one which is commercially available under the designation "Chyron IV". Character generator 40 communicates via a data bus 41 with a CPU 43. In this embodiment, the character generator transmits twenty bits of TTL communication information through data bus 41. A further data bus 44 interconnects character generator 40 and an ECL interface 46. Data bus 44 carries sixteen bits of video information to the ECL interface; twelve of the bits representing the RGB's (reds, greens, and blues, of the character generator), and four bits of encoded RGB information which is to be stored and manipulated by the special effects arrangement.

Unlike the monochrome arrangement of FIG. 1, the multicolor arrangement of FIG. 2 does not contain a circuit element equivalent to key strip and pack 14 of FIG. 1. This results from the fact that the four bits of encoded RGB totally define the areas of the video screen where the key video information from the character generator is desired to be placed. The desired key shapes, in this embodiment, are generated by character generator 40, and such information need not be stripped off of the video signal.

The four bits of encoded RGB are provided at an output of ECL interface 46, and conducted to a pack arrangement 47. Pack arrangement 47 packs the four bits of encoded RGB's into bytes having eight bits each, as was achieved in the monochrome arrangement of FIG. 1. Pack arrangement 47 contains four shift registers which shift one pixel each count of 70 nanoseconds. When eight such pixels have been packed into a shift register, the pack arrangement is pulsed to indicate that a byte has been received.

Pack arrangement 47 is connected at respective outputs to switches 49-52 which bear functional correspondence to switch 17 in FIG. 1. Each of switches 49-52 in FIG. 2 is connected at its output to a respective one of four 64K×8 random access memories, 55-58. As is the case with the embodiment of FIG. 1, switches 49-52 are under control of CPU 43 to select whether the data which is provided to memories 55-58 is derived from character generator 40, via ECL interface 46 and packer arrangement 47, or CPU 43. Memories 55-58 can be interrogated via a switch 59 which is coupled at it inputs to respective ones of memories 55-58, and at its output to the DATA port of CPU 43.

Each of the four memories 55-58 is loaded with bytes which contain 8 bits of shifted data. Four bits, one bit from each memory represents an encoded color which will be placed at some commonly addressed location on the screen. Thus, during manipulation of the data, the four memories produces a four-bit data word, instead of the one-bit output of the embodiment of FIG. 1. The four-bit data word which is provided at the data outputs of the memories is conducted to a switch block 60 which is controlled by CPU 43. Switch block 60 is connected at its output to a 16×16 memory which is known as palette memory 61. CPU 43, via switch block 60, selects whether palette memory 61 is addressed by the combined outputs of memories 55-58, or by an address signal from CPU 43. In response to the address signals, palette memory 61 will produce sixteen data bits at its data output. Twelve of the sixteen bits will be red, green, and blue information, at four bits each. The remaining four of the sixteen bits constitute control information. Thus, when a four-bit address code is received by palette memory 61, the palette memory produces a unique sixteen bit data word containing therein red information, green information, blue information, and control information. The contents of the palette memory are preloaded by CPU 43. In this manner, the RGB and control information which is produced at the output of palette memory 61 in response to the addressing outputs of memories 55–58, is predeterminable for each unique four-bit address code. Thus, by manipulating four bits out of memories 55–58, any of up to sixteen different twelve-bit colors can be called.

The red, green, and blue outputs of palette memory 61 are connected to a large switching block 62 which is responsive to control by CPU 43 and the control output of palette memory 61. Large switching block 62 receives at further inputs thereof the unencoded RGB information from ECL interface 46. Thus, large switching block 62 is operated to select whether the RGB's from the special effects arrangement, or the RGB's from the character generator, will be present on the video screen at any one time; such a determination being made for each pixel period. The digitized RGB information which is available at the output of large switching block 62 is conducted to a digital-to-analog converter 68. Digital-to-analog converter 68 produces at its outputs the analog color video signal in RGB.

Figure 3:
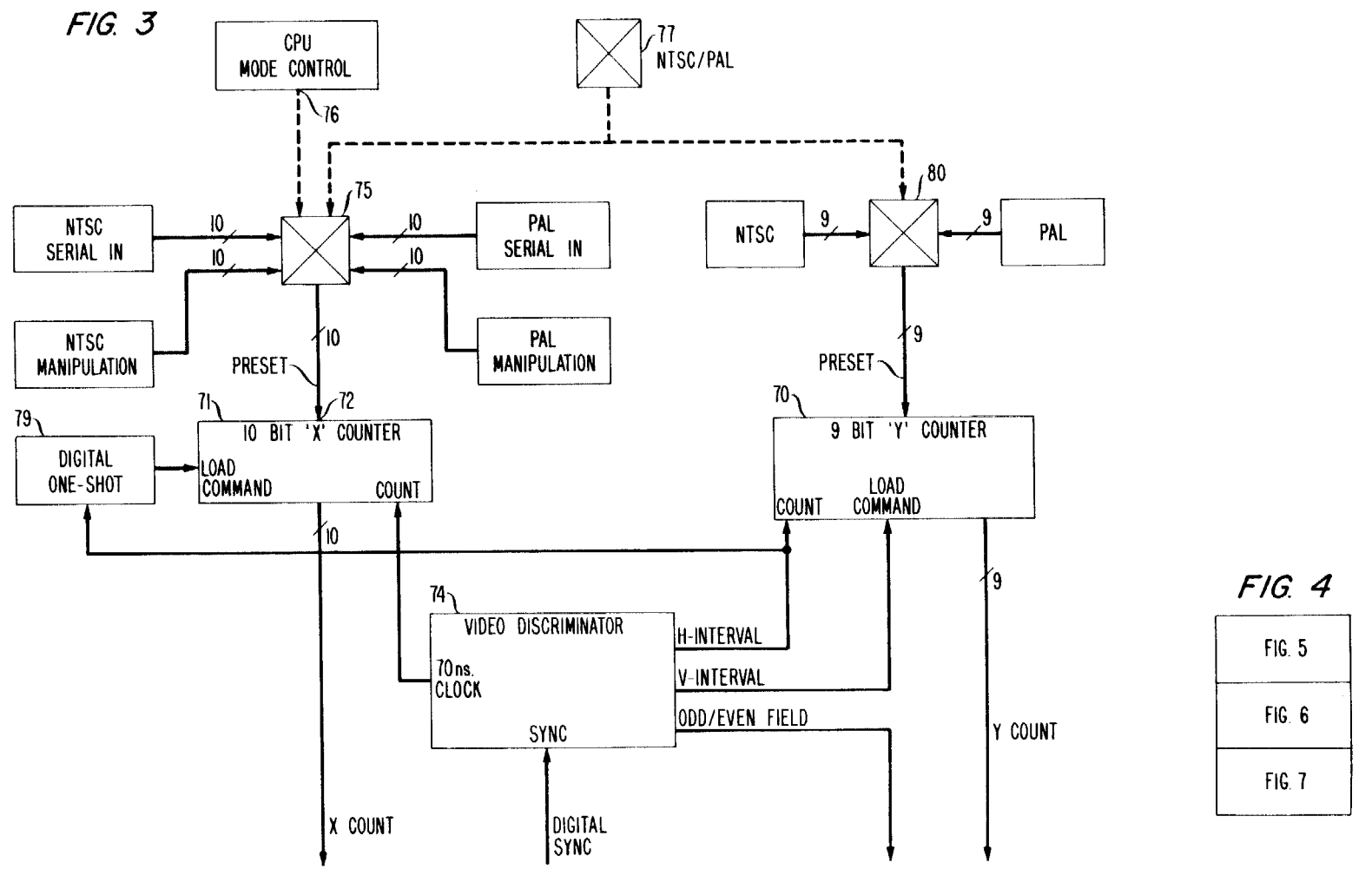

FIG. 3 is a block and line representation of an x, y coordinate generator which utilizes a y-counter 70 for counting lines, and an x-counter 71 for counting pixels across each line. The x-counter is provided with a preset input 72 for preloading, in this embodiment, the most negative number that the pixel count is going to start with on each line. In this manner, the left side of every screen will be the negative region for the x count. The x, y coordinate generator is further provided with a video discriminator 74 which receives a video sync signal, determines when the horizontal (H) interval for each line begins, determines when the vertical (V) interval for each field begins, and whether the field is going to be odd or even. These signals are used to control x-counter 71 and y-counter 70.

The particular embodiment of the x, y coordinate generator shown in FIG. 3 is adaptable for operation within several television conventions, illustratively, the North American NTSC Standard, or the European PAL Standard. The x, y coordinate manipulator which was mentioned as element 21 in FIG. 1 and which will be described in detail with respect to FIGS. 4–7 is required to solve an equation using a "pipeline" technique wherein the equation is divided into small pieces. The overall "pipeline" therefore has a pipeline length in a serial-in mode of operation which differs from the pipeline length during manipulation. Thus, there must be provided in the x, y coordinate generator a provision for starting the x count at a most negative number which differs depending upon the mode of operation. The most negative x number will also differ depending upon whether the system is operating under the NTSC or PAL standards.

The selection of the most negative x number is performed by operation of a switch 75 which is responsive to the CPU by virtue of its connection to a mode control output 76 of the CPU. Switch 75 is also responsive to a finger switch 77 which permits the operator of the arrangement to select whether the system will be operated under the PAL or NTSC standards. The combined control of the CPU and finger switch 77 allows switch 75 to select whether the most negative x number which is preset into x-counter 71 will correspond to either the NTSC or PAL standards, in either the serial-in or manipulation modes of operation. At every H interval, or at the beginning of a line, a digital one-shot circuit pulses the x-counter at a load command input thereof so that the most negative x number can be entered. After the load command pulse from the digital one-shot circuit, which is obtained from the H-interval output of video discriminator 74, has disappeared, the 70 nanosecond clock which is phaselocked to the video discriminator causes the x-counter to begin counting upward. The x-counter begins counting from the most negative x number until it gets to zero, where zero corresponds to the center of the screen in the middle of a line. The x-counter continues counting into the positive region until it reaches its maximum positive number. At this point, another H interval signal is received, and the x-counter is reloaded with the most negative x number, and the counting process is repeated.

The y-counter 70 functions similarly to the x-counter, except that it counts lines. In essence, y-counter 70 counts the number of H intervals that have passed, and it will begin its count at the end of the V interval. The V interval signal from video discriminator 74 jams the load command input of the y-counter to force a most negative y number to be entered via a switch 80 at every H interval throughout the V interval. As indicated in FIG. 3, switch 80 is controlled by finger switch 77 and selects whether the most negative y number corresponds to the NTSC or PAL standards. In the case of the y-counter, the starting negative y count is the same for the serial-in and manipulation modes of operation, irrespective of whether the unit is operating under the NTSC or PAL standards. At each H interval after the V interval has passed the y-counter is incremented by one, thereby counting lines. Since the starting value is the most negative number, the top of the screen is negative. The y-counter counts down to the center of the screen, passes through zero, and counts into the positive region, which is the lower part of the screen. The occurrence of a signal from the V interval output of video discriminator 74 causes this operation to repeat.

The entire video picture is divided into two full scans called "fields." Each field contains half of the video information which is required to make one entire video picture. The fields are designated "odd" and "even" fields and utilize an interlacing scheme wherein the scan lines of the odd field are visually interlaced with the scan lines of the even fields. For this reason, the y-counter is only nine bits wide, in this embodiment. The least significant bit of the y coordinate is provided as either a one or a zero by the odd/even field output of the video discriminator. The remaining nine bits are the result of the y count.

Figure 5:
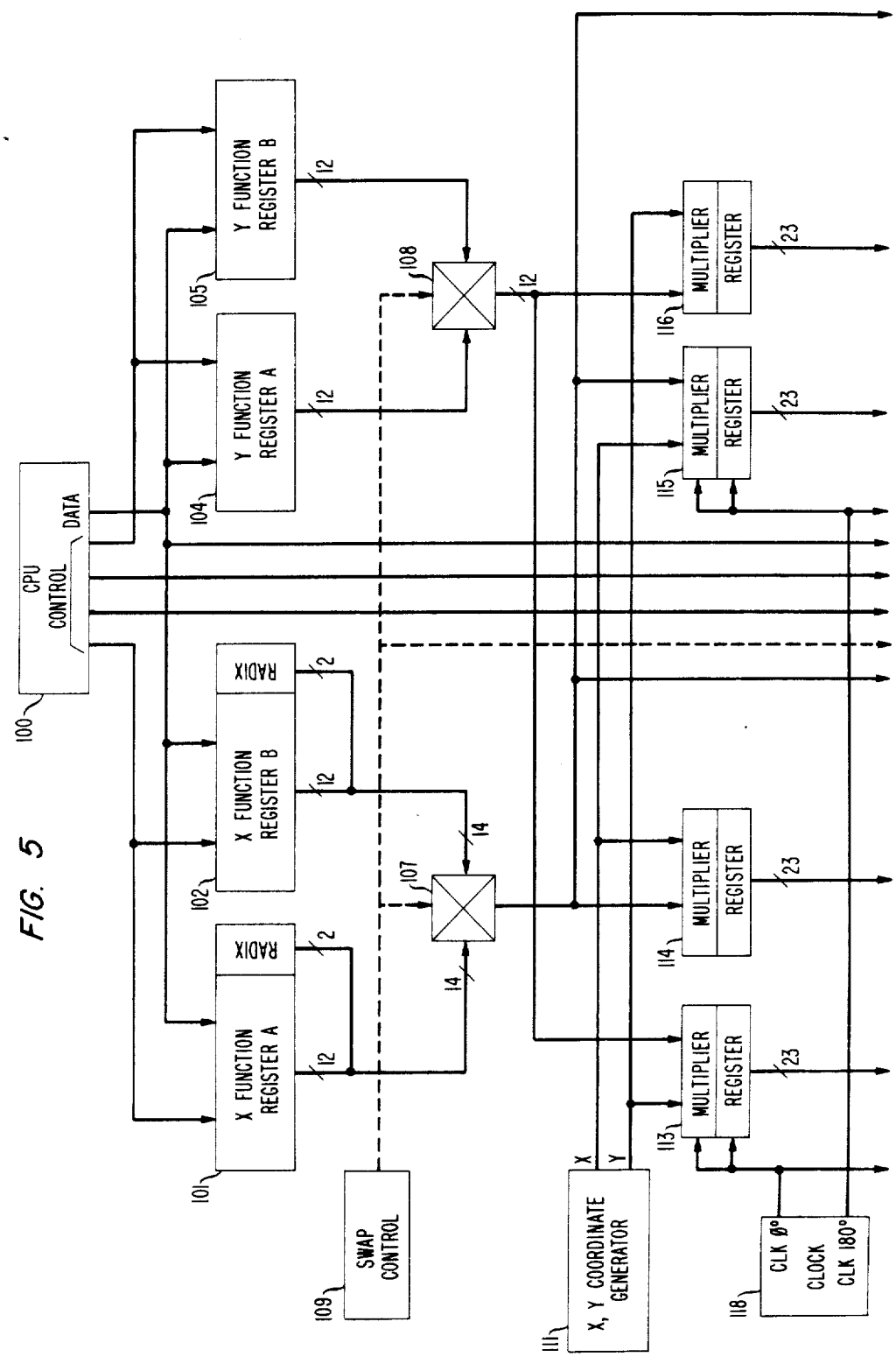
Figure 6:
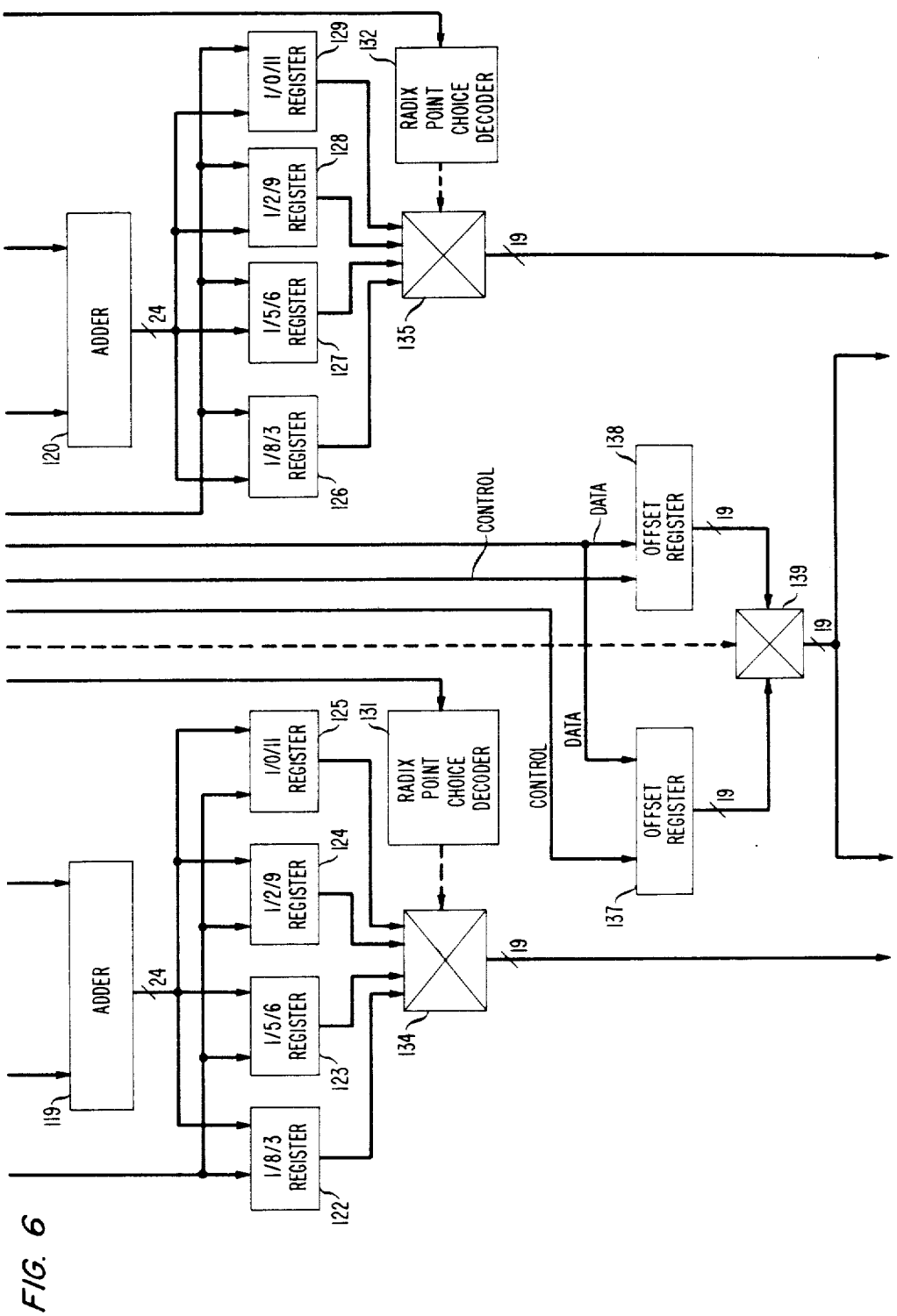
Figure 7:
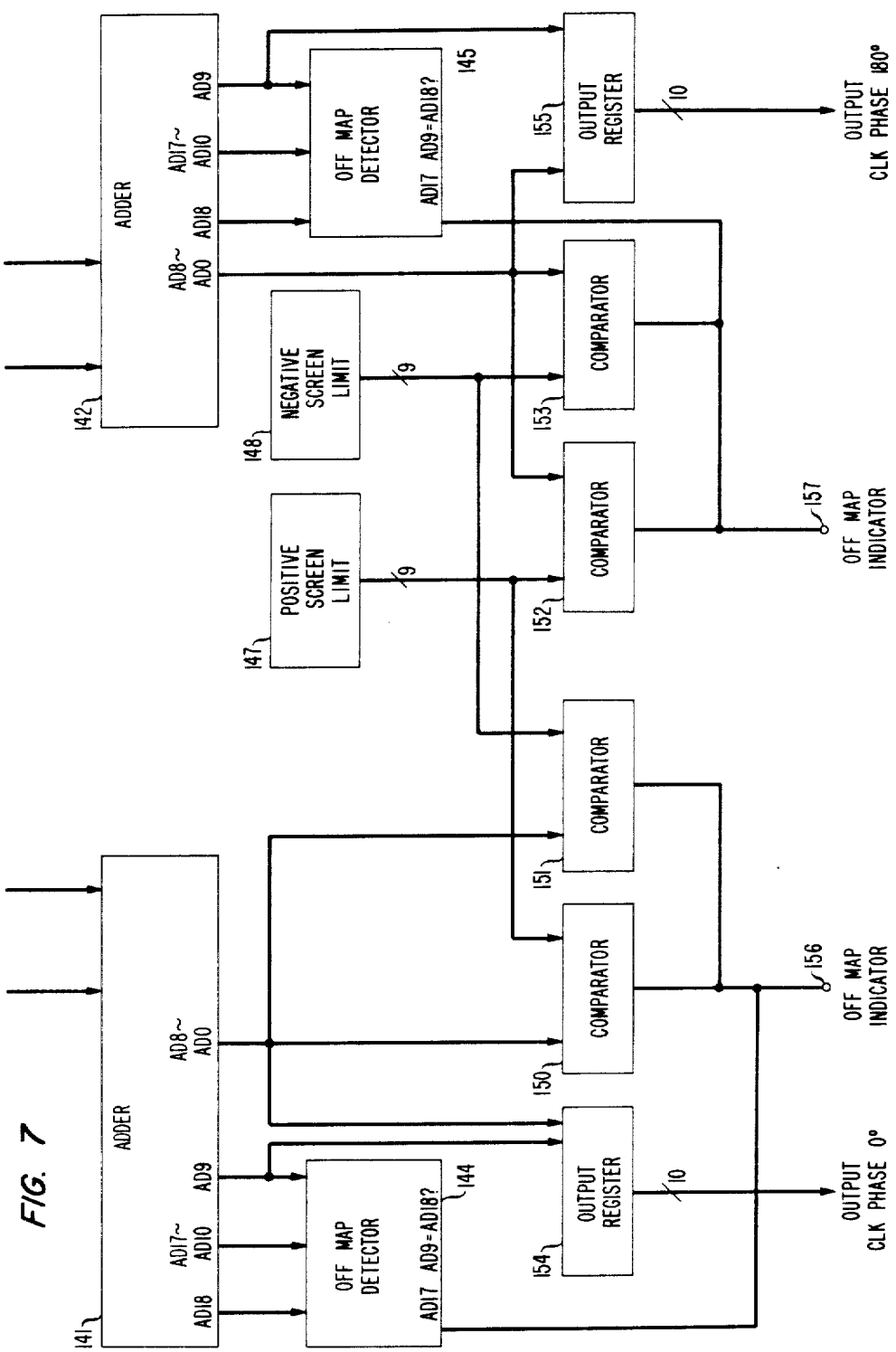

FIG. 4 illustrates the manner in which FIGS. 5, 6, and 7 are combined to produce a block and line representation of an x, y coordinate manipulator in accordance with the invention and which is useful in the embodiment of FIG. 1. The function of the coordinate manipulator is to solve equations, illustratively the equation for the rotation of coordinate axes, as follows:

$$X(\text{new}) = X(\text{current}) \cos \phi + Y(\text{current}) \sin \phi$$

$$Y(\text{new}) = X(\text{current}) \sin \phi + Y(\text{current}) \cos \phi$$

The solution of this equation permits the subject special effects system to perform rotations about the z axis, i.e., similar to the rotation of a steering wheel. This equation can be modified by the inclusion of offset parameters, so as to facilitate the positioning of the effect on the video screen. The equation with offsets reads as:

$$X(\text{new}) = X(\text{current}) \cos \phi + Y(\text{current}) \sin \phi + X(\text{offset})$$

$$Y(\text{new}) = -X(\text{current}) \sin \phi + Y(\text{current}) \cos \phi + Y(\text{offset})$$

In some embodiments, it may also be desirable to alter the size and perspective of the effect by utilizing A and B factors, as follows:

$$X(\text{new}) = A \, [X(\text{current}) \cos \phi + Y(\text{current}) \sin \phi + X(\text{offset})]$$

$$Y(\text{new}) = B \, [-X(\text{current}) \sin \phi + Y(\text{current}) \cos \phi + Y(\text{offset})]$$

This equation becomes:

$$X(\text{new}) = X(\text{current}) \, A \cos \phi + Y(\text{current}) \, A \sin \phi + AX(\text{offset})$$

$$Y(\text{new}) = -X(\text{current}) \, B \sin \phi + Y(\text{current}) \, B \cos \phi + BY(\text{offset})$$

During the V blanking of each field, the CPU calculates a variety of functions which relate to the position, size, and rotation of the special effect. Some illustrative ones of the functions include:

| | |
|---|---|
| $F_{xx} = A \cos \phi$ | $F_{yy} = B \cos \phi$ |
| $F_{xy} = A \sin \phi$ | $F_{yx} = B \sin \phi$ |
| $F_{offx} = AX(\text{offset})$ | $F_{offy} = BY(\text{offset})$ |

The substitution of the computed functions into the above equation provides the following simplification:

$$X(\text{new}) = X(\text{current}) F_{xx} + Y(\text{current}) F_{xy} + F_{offx}$$

$$Y(\text{new}) = X(\text{current}) F_{yx} + Y(\text{current}) F_{yy} + F_{offy}$$

The simplified equations are identical in form. Thus, the solution of these equations requires two separate, but identical, computational circuits. The values X(new) and Y(new) relate to the location in memory where a desired pixel is found. The values X(current) and Y(current), however, are provided with a 70 ns resolution by the x, y coordinate generator, in this embodiment. Mathematical generalization of the simplified equations produces a relationship which may be expressed as:

$$M(\text{address}) = X(\text{coor.}) \, F_x + Y(\text{coor.}) F_y + \text{offset}$$

Thus, the address (M (address)) of the memory corresponds to an x coordinate value (X(coor.)) operated upon by a function of x, ($F_x$), a y coordinate (Y(coor.)) operated upon by a function of y, ($F_y$), and an offset value.

The x, y coordinate manipulator embodiment which is shown in the combined FIGS. 4, 5, 6, and 7, is provided with duplicated circuits, each of which performs the mathematical computations in the same way. One circuit computes a new x coordinate, and the other computes a new y coordinate. As previously noted hereinabove, the x, y coordinate manipulator is required to provide a new coordinate pair each 70 ns. However, the state of the art which prevailed at the time that the inventive circuitry was designed did not allow the required mathematical information to be produced reliably within the specified 70 ns time interval. For this reason, certain circuit elements of the x, y coordinate manipulator replicated and multiplexed so that the replicated portions of the circuits can produce the desired solution alternatingly in time. It is to be understood that persons skilled in the art can eliminate the multiplexing arrangement described hereinbelow from embodiments of the invention which operate at slower speeds, or when the state of the art has progressed to the point where sufficiently fast mathematical circuitry is available.

In the present embodiment, CPU 100, which corresponds to CPU 18 in FIG. 1, is connected at its data output to an x-function register A 101, an x-function register B 102, a y-function register A 104, and a y-function register B 105. Registers 101, 102, 104, and 105 receive the $F_x$ and $F_y$ parameters from CPU 100 under the control of signals at the control output of the CPU. Registers 101 and 102 receive the $F_x$ parameters, and registers 104 and 105 receive the $F_y$ parameters. In this embodiment, one of registers 101 and 102 receives the $F_x$ parameter data, while the other is active in the processing which will be described hereinbelow. Similarly, one of registers 104 and 105 is loaded while the other is active. Registers 101 and 102 are connected at their outputs to respective inputs of a switch 107. Registers 104 and 105 are similarly connected at their outputs to a switch 108. Switches 107 and 108 are operated under the control of a swap control unit 109. In some embodiments of the invention, the swap control unit may be incorporated into the CPU.

Switch 107 produces at its output the output signal received from either register 101 or register 102, depending upon the nature of the control signal from swap control unit 109. Similarly, switch 108 produces at its output the output of either register 104 or register 105.

Switches 107 and 108 are connected at their outputs to respective ones of a plurality of multipliers 113-116. In one embodiment, multipliers 113-116 are of the type where data pertaining to a multiplicand is received via twelve data lines, and the data pertaining to the multiplier is also received via twelve data lines. Such multipliers are known in the art as "12×12". As noted hereinabove, such 12×12 multipliers perform multiplications rather slowly so that the product produced at the outputs thereof is not available soon enough. For this reason, the multipliers are multiplexed in this embodiment, thereby affording each multiplier circuit 140 ns to complete the multiplication.

In multipliers 113-116, twelve bits of $F_x$ and $F_y$ data are multiplied by ten bits of signed coordinate bits resulting in 23 signed bits. As shown in the drawing, switch 107 is connected at its output to inputs of multipliers 114 and 115. Thus, these multipliers receive information pertaining to $F_x$. Switch 108 is connected at its output to multipliers 113 and 116 so as to provide data pertaining to $F_y$ thereto. An x, y coordinate generator 111, which may correspond to coordinate generator 11 of FIG. 1, is connected to the remaining inputs of multipliers 113-116. More specifically, the x coordinate output of coordinate generator 111 is connected to inputs of multipliers 114 and 115. The y coordinate output is connected to multipliers 113 and 116. This results in products of the form $XF_x$ and $YF_y$.

As previously noted, multipliers 113-116 may be of a type which operates too slowly, thereby requiring multiplexing. Such multiplexing is achieved by operation of a clock generator 118 having two outputs which are out of phase with respect to each other.

Multipliers 113 and 114 are connected at their outputs to respective inputs of an adder 119. Multipliers 115 and 116 are connected at their outputs to respective inputs of an adder 120. Adders 119 and 120 produce at their outputs data corresponding to the sums of the products of the multipliers connected at their respective inputs. It should be noted here that the products of the respective multipliers are retained in respectively associated register portions. These registers therefore hold the X(coor.)$F_x$ and Y(coor.)$F_y$ products. These products are added together by adders 119 and 120. Multipliers 113–116, and their associated respective registers, produce the products in the form of 23 bit products which are combined in adders 119 and 120 to produce 24 signed bits. The extra bit provides for a possible overflow in the sum; the sum being provided in the output of each adder and available to be clocked into the next stage of the system.

The next stage of the system contains 8 radix point choice registers 122–129. Generally, in this embodiment, the twelve bit function parameters which are stored in function registers 101, 102, 104, and 105 under control of CPU 100 are in the form of signed binary. Accordingly, the signed binary consists of one sign bit and eleven significant other bits. CPU 100, however, depending upon the manipulation being performed, can select a binary radix point at any place in the field of eleven bits. A binary radix point corresponds to a decimal point in base 10. The combination of circuit elements described hereinabove is not concerned with where in the field the CPU has assumed a radix point. However, ten significant integer bits above the radix point will be ultimately selected to represent a coordinate address for a memory access. The radix point choice registers 122–129 permit the CPU to assume four choices of radix point locations. One such choice, for example, is one signed bit, eight bits above the radix point, and three bits below the radix point. This assignment of bits, for the sake of convenience, can be designated as "1/8/3". The four possible choices illustratively are 1/8/3, 1/5/6, 1/2/9, and 1/0/11. The reason that only four possible radix points location choices are available is that these listed choices are deemed to provide sufficient resolution in this embodiment throughout the entire range of desired manipulations. Two control bits from the CPU are used to call out one of the choices. It should be noted that there exists an inverse relationship between the size of the coordinate for memory access, and the apparent size of the image on the video screen. Thus, for example, the 1/8/3 choice which has a high whole number resolution, is used for very small compressions. On the other hand, the 1/0/11 choice which has high fractional resolution is used for very large expansions, in this embodiment.

In the present specific illustrative embodiment, adder 119 is connected at its output to four of the radix point choice registers 122–125. Registers 122–125 are clocked by clock generator 118. Adder 120 is connected at its output to four radix point choice registers 126–129 which are also clocked by clock generator 118. Multipliers 113, 114, and registers 122–125 receive clock pulses from clock generator 118 which are 180° out of phase with the clock signals which are received by multipliers 115 and 116, and registers 126–129.

Each of registers 122–129 of the specific embodiment is a twenty bit register which receives the data corresponding to the $XF_x+YF_y$ at the output of adders 119 and 120. CPU 100, which knows which radix point format of the four possible combinations, 1/8/3, 1/5/6, 1/2/9, or 1/0/11 it has assumed for function parameters $F_x$ and $F_y$, indicates the particular selection by the appropriate combination of bits which are entered into the radix portions of registers 101 and 102. These radix selection bits are conducted through switch 107 to radix point choice deooders 131 and 132. Decoders 131 and 132 control the operation of a pair of switches 134 and 135, respectively. Thus, in operation, adder 119 provides the $XF_x+YF_y$ data to each of registers 122, 123, 124, and 125, at a time determined by a pulse from the noninverted output of clock generator 118. Adder 120 provides the $XF_x+YF_y$ data to each of registers 126, 127, 128, and 129 at a time determined by a pulse from the inverted output of clock generator 118. In this manner, the group of registers 122–125 latches in its data at times which alternate with the latching in of data into the group of registers 126–129.

Although each of registers 122–125 contain identical data, each register internally subdivides the data into a respective one of the four radix point formats. Thus, for example, register 122 contains the $XF_x+YF_y$ data in the 1/8/3 radix point format. Register 123 contains the same data in the 1/5/6 radix point format. Registers 124 and 125 contain the data in the 1/2/9 and 1/0/11 formats, respectively. The data is similarly organized in registers 126–129.

Each of registers 122–125 is connected at its output to switch 134, and each of registers 126–129 is connected at its output to switch 135. As previously indicated, switches 134 and 135 are responsive to respective radix point choice decoders 131 and 132. In this manner, the radix information which is provided by CPU 100 and stored in registers 101 and 102 is conducted to decoders 131 and 132 so that they may cause their respective switches 134 and 135 to select appropriate ones of the registers from the respective groups of registers 122–125 and registers 126–129. Switches 134 and 135 therefore provide at their respective outputs the $XF_x+YF_y$ data in the appropriate radix format.

The data output of CPU 100 is also connected to a pair of offset registers 137 and 138 which receive offset data which is intended to offset the position of the data produced at the outputs of switches 134 and 135. Thus, this offset information positions the special effect on the video screen. Offset registers 137 and 138 are connected at their outputs to respective inputs of a switch 139 which is controlled in response to signals from swap control unit 109. In this manner, swap control unit 109 selects whether the offset information in offset register 137 or the offset information in offset register 138 will be provided at the output of switch 139.

Switch 139 is coupled at its output to adders 141 and 142. Adder 141 receives at a further input thereof the $XF_x+YF_y$ data at the output of switch 134. Similarly, adder 142 receives at a further input the $XF_x+YF_y$ data which is available at the output of switch 135.

Adders 141 and 142 perform the addition of $(XF_x+YF_y)+$offset. Each of adders 141 and 142 adds 19 bits from the radix point choice registers to 19 bits from the offset registers. In this particular embodiment, the least significant 10 bits, AD9–AD0, comprise the new coordinate. It has been predetermined that the maximum value of the coordinate is within a 10 bit range. Thus, although only the least significant 10 bits will comprise the new coordinate, tests must be performed on the entire number to determine whether the answer is within the legitimate 10 bit range. When an image was written into memory, 10 bits of x and 10 bits of y coordinates were employed for addressing. However, the entire 10 bit range is available but not used in either case. Within the 10 bits a fixed negative range and fixed positive range were all that was used. Thus, with the 19 bits which result from $XF_x+YF_y+$offset, the result must be tested to see if AD9-AD0, the lower 10 bits, truly represent a valid coordinate in the legal image map range. This must be done in two ways. If all of the bits AD9 and above to AD18 do not equal the highest bit (sign bit), then the number is greater or less than what 10 bits can represent. Also, if the number is legitimately within a 10 bit range, it must be compared to the negative and positive limits of the legal range to determine whether it is within the legal range. The highest bits AD18-AD9 of each of adders 141 and 142 are conducted to respective off map detectors 144 and 145. In one embodiment, off map detectors 144 and 145 may each consist of a plurality of exclusive-OR gates (not shown), each receiving at one input a respective one of the bits from the adders, and the other inputs of the exclusive-OR gates are connected to each other and to the respective sign bit AD18. With such an off map detector the next lower 9 bits are compared to the signed bit. It should be noted, however, that there may be several sign bits because the number is sign-extended to maintain a 19 bit format. In this embodiment, therefore, the lower 9 bits are compared against the highest sign bit. If any of the next lower 9 bits does not equal the highest sign bit, the respective exclusive-OR gate in the off map detector will go high. Each such exclusive-OR gate, in this embodiment, therefore feeds an open collector-inverter with each of the outputs wired together. Thus, if one of the exclusive-OR gates goes high, indicating non-equivalence, the output of its associated inverter will pull the entire bus low. The low state of the output bus of the off map detector indicates that the 19 bit result is outside of the legal image map. This indication is present at the output of the off map detectors.

Once it has been determined that the value of the bits AD18-AD0 is truly within a valid 10 bit range, it must be determined whether the value is within the limited legal range within those 10 bits. The positive upper limit is provided at a positive screen limit input 147, and the negative limit is provided at a negative screen limit input 148. The positive and negative limit values are predetermined. A plurality of comparators 150-153 are utilized in this embodiment in the comparison between the values of bits AD8-AD0, of adders 141 and 142, with the positive and negative limits present at inputs 147 and 148. The sign bits AD9 are not needed in the comparisons and are used merely to determine which result is gated to the output of the off map detectors. Thus, 9 bits AD8-AD0 of adder 141 are compared in comparator 150 with the positive screen limit value at input 147, and in commarator 151 with the negative screen limit value at input 148. Similarly, the 9 bits AD8-AD0 of adder 142 are compared in comparator 152 against the positive screen limit value at input 147, and in comparator 153 against the negative screen limit value at input 148. If, in the negative range, the value of bits AD8-AD0 is less than the negative screen limit value, the number is off map. If in the positive range, the value of bits AD8-AD0 is greater than the positive screen limit value, the number is off map.

The system is provided with a pair of output registers 154 and 155 which produce at their outputs the new coordinate values. Each such register receives the 9 bits AD8-AD0 from its associated one of adders 141 and 142, and the sign bit AD9. This value is present at the outputs of output registers 154 and 155, and, with an associated bit of off map information present at terminals 156 and 157, form the answer to the equation. As shown in FIG. 1, these values, while the system is in the address manipulation mode, are conducted to the compaction circuit 22 and address memory 15.

Although the invention has been described in terms of specific embodiments and applications, persons skilled in the art, in light of this teaching, can generate additional embodiments without departing from the spirit or exceeding the scope of the claimed invention. Accordingly, the drawings and descriptions in this disclosure are proffered to facilitate comprehension of the invention and should not be construed to limit the scope thereof.

What is claimed is:

1. In a video processing system of the type wherein video information is stored in a memory having a plurality of storage locations for storing respective predetermined portions of a video signal, each storage location having an associated memory address in the form of a memory address coordinate pair, a memory address coordinate manipulator arrangement comprising:
   function register means for receiving function data corresponding to a selected mathematical function representative of a desired displacement of a selected one of the predetermined portions of the video signal with respect to the associated storage location in the memory;
   input means for receiving the memory address coordinate pair corresponding to said selected one of the portions of the video signal which is desired to be displaced;
   arithmetic means for combining said function data and said memory address coordinate pair corresponding to said selected one of the portions of the video signal in accordance with a predetermined sequence of arithmetic steps for producing a solution to a generalized displacement equation; and
   offset register means for receiving offset data corresponding to a desired fixed displacement of said selected one of the predetermined portions of the video signal.

2. The memory address coordinate manipulator arrangement of claim 1 wherein there is further provided offset adder means for adding said offset data to said solution to said generalized displacement equation.

3. The memory address coordinate manipulator arrangement of claim 1 wherein there are further provided:
   at least first and second radix point register means for storing said solution to said generalized displacement equation in respective radix formats; and
   radix decoder means for selecting one of said first and second radix point register means.

4. The memory address coordinate manipulator arrangement of claim 3 wherein there is further provided switch means having at least first and second inputs connected to respective ones of said first and second radix point register means and a control input connected to said radix decoder means for producing at an output of said switch means said solution to said generalized displacement equation in a radix format selected in response to said radix decoder means.

5. The memory address coordinate manipulator arrangement of claim 1 wherein said arithmetic means comprises:
  first multiplication means connected to said function register means and said input means for producing a first product value corresponding to the product of said function data and a first half of said memory address coordinate pair;
  second multiplication means for producing a second product value corresponding to the product of said function data and a second half of said memory address coordinate pair;
  first adder means for forming a first sum value corresponding to the addition of said first and second product values; and
  second adder means for forming a second sum value corresponding to the addition of said first sum value and an offset value.

6. The memory address coordinate manipulator arrangement of claim 5 wherein there are further provided:
  positive and negative screen limit input means for receiving positive and negative numerical limit values, respectively; and
  comparator means for comparing said second sum value against said positive and negative numerical limit values.

7. A method for producing video special effects, the method having the steps of storing a video signal in a memory wherein portions of the video signal are stored in respective memory locations which are identified with respective addresses in the form of coordinate pairs, and producing coordinate pairs data in a sequential order which corresponds to the order in which the portions of the video signal would be delivered to a video screen to produce an image which corresponds directly to the video signal, the method further comprising the steps of:
  generating function data corresponding to a mathematical function which defines a special effect which is desired to be achieved;
  arithmetically manipulating said function data and the coordinate pairs data in accordance with a generalized special effect equation to produce manipulated coordinate pair data, said step of arithmetically manipulating including the steps of (a) producing first and second product values corresponding to a multiplication of said function data and first and second halves of the coordinate pairs data, and (b) producing said manipulated coordinate pair data by adding said first and second product values to one another; and
  addressing the memory with said manipulated coordinate pair data to produce a manipulated image on the video screen which has been displaced with respect to the image which corresponds directly to the video signal in accordance with said mathematical function.

8. The method of claim 7 wherein said step of arithmetically manipulating comprises the further step of displacing the video special effect on the video screen by adding an offset value to said manipulated coordinate pair data.

9. The method of claim 7 wherein there is provided the further step of storing said manipulated coordinate pair data in a plurality of registers which are adapted for respective sign and radix formats.

10. The method of claim 9 wherein there is further provided the step of selecting one of said registers to provide said manipulated coordinate pairs data in a selected radix format.

11. The method of claim 8 wherein there is provided the further step of comparing the sum of said offset value and said manipulated coordinate pairs data against predetermined positive and negative limits to determine whether the video special effect is presented within a predetermined area on the video screen.

12. In a video processing system of the type wherein video information is stored in a memory having a plurality of storage locations for storing respective predetermined portions of a video signal, each storage location having an associated memory address in the form of a memory address coordinate pair, a memory address coordinate manipulator arrangement comprising:
  function register means for receiving function data corresponding to a selected mathematical function representative of a desired displacement of a selected one of the predetermined portions of the video signal with respect to the associated storage location in the memory;
  input means for receiving the memory address coordinate pair corresponding to said selected one of the portions of the video signal which is desired to be displaced;
  arithmetic means for combining said function data and said memory address coordinate pair corresponding to said selected one of the portions of the video signal in accordance with a predetermined sequence of arithmetic steps for producing a solution to a generalized displacement equation;
  first and second radix point register means for storing said solution to said generalized displacement equation in respective radix formats; and
  radix decoder means for selecting one of said first and second radix point register means.

13. The memory address coordinate manipulator arrangement of claim 12 wherein there is further provided switch means having at least first and second inputs connected to respective ones of said first and second radix point register means and a control input connected to said radix decoder means for producing at an output of said switch means said solution to said generalized displacement equation in a radix format selected in response to said radix decoder means.

14. In a video processing system of the type wherein video information is stored in a memory having a plurality of storage locations for storing respective predetermined portions of a video signal, each storage location having an associated memory address in the form of a memory address coordinate pair, a memory address coordinate manipulator arrangement comprising:
  function register means for receiving function data corresponding to a selected mathematical function representative of a desired displacement of a selected one of the predetermined portions of the video signal with respect to the associated storage location in the memory;
  input means for receiving the memory address coordinate pair corresponding to said selected one of the portions of the video signal which is desired to be displaced; and
  arithmetic means for combining said function data and said memory address coordinate pair corresponding to said selected one of the portions of the video signal in accordance with a predetermined sequence of arithmetic steps for producing a solution to a generalized displacement equation, said arithmetic means including (a) first multiplication means connected to said function register means and said input means for producing a first product value corresponding to the product of said function data and a first half of said memory address coordinate pair, (b) second multiplication means for producing a second product value corresponding to the product of said function data and a second half of said memory address coordinate pair, (c) first adder means for forming a first sum value corresponding to the addition of said first and second product values, and (d) second adder means for forming a second sum value corresponding to the addition of said first sum value and an offset value.

15. The memory address coordinate manipulator arrangement of claim 14 wherein there are further provided:
  positive and negative screen limit input means for receiving positive and negative numerical limit values, respectively; and
  comparator means for comparing said second sum value against said positive and negative numerical limit values.

16. A method for producing video special effects, the method having the steps of storing a video signal in a memory wherein portions of the video signal are stored in respective memory locations which are identified with respective addresses in the form of coordinate pairs, and producing coordinate pairs data in a sequential order which corresponds to the order in which the portions of the video signal would be delivered to a video screen to produce an image which corresponds directly to the video signal, the method further comprising the steps of:
  generating function data corresponding to a mathematical function which defines a special effect which is desired to be achieved;
  arithmetically manipulating said function data and the coordinate pairs data in accordance with a generalized special effect equation to produce manipulated coordinate pair data;
  storing said manipulated coordinate pair data in a plurality of registers which are adapted for respective sign and radix formats; and
  addressing the memory with said manipulated coordinate pair data to produce a manipulated image on the video screen which has been displaced with respect to the image which corresponds directly to the video signal in accordance with said mathematical function.

17. The method of claim 16 wherein there is further provided the step of selecting one of said registers to provide said manipulated coordinate pairs data in a selected radix format.

* * * * *

UNITED STATES PATENT AND TRADEMARK OFFICE
CERTIFICATE OF CORRECTION

PATENT NO. : 4,533,952
DATED : August 6, 1985
INVENTOR(S) : James Norman III

It is certified that error appears in the above-identified patent and that said Letters Patent is hereby corrected as shown below:

Column 3, line 41, "+offset This" should read -- +offset --.

Column 6, line 25, "64Kx33 8 RAM" should read

-- 64K x 8 RAM --.

Column 14, line 7, "deooders" should read -- decoders --.

Signed and Sealed this

Fourth Day of March 1986

[SEAL]

Attest:

DONALD J. QUIGG

Attesting Officer

Commissioner of Patents and Trademarks